United States Patent
Cutcher et al.

(10) Patent No.: US 6,752,469 B1
(45) Date of Patent: Jun. 22, 2004

(54) COMPOSITE WHEEL ASSEMBLY

(75) Inventors: Douglas J. Cutcher, Bloomfield Hills, MI (US); Mark Bennett, Rochester, MI (US); Scott A. Hogan, Sylvan Lake, MI (US); David Browning Ferriss, Novi, MI (US)

(73) Assignee: McKechnie Vehicle Components (USA), Inc., Troy, MI (US)

( * ) Notice: Subject to any disclaimer, the term of this patent is extended or adjusted under 35 U.S.C. 154(b) by 0 days.

(21) Appl. No.: 10/361,369

(22) Filed: Feb. 10, 2003

(51) Int. Cl.$^7$ ................................................ B60B 7/00
(52) U.S. Cl. .............................. 301/37.11; 301/37.43
(58) Field of Search ..................... 301/37.101, 37.102, 301/37.11, 37.42, 37.43

(56) References Cited

U.S. PATENT DOCUMENTS

| | | | |
|---|---|---|---|
| 1,858,228 A | 5/1932 | Lyon | |
| 1,985,378 A | 12/1934 | Lyon | |
| 3,517,968 A | 6/1970 | Tully et al. | |
| 3,669,501 A | 6/1972 | Derleth | |
| 3,918,762 A | 11/1975 | Hampshire | |
| 4,251,476 A | 2/1981 | Smith | |
| 4,270,805 A | 6/1981 | Spisak | |
| 4,344,654 A | 8/1982 | Apezynski | |
| 4,530,542 A | 7/1985 | Spiegel et al. | |
| 4,659,148 A | 4/1987 | Grill | |
| 4,874,206 A | 10/1989 | Sampson | |
| 4,976,497 A | 12/1990 | Post et al. | |
| 5,031,966 A | 7/1991 | Oakey | |
| 5,098,272 A | 3/1992 | Joseph et al. | |
| 5,128,085 A | 7/1992 | Post et al. | |
| 5,131,727 A | 7/1992 | Johnson | |
| 5,143,426 A | 9/1992 | Todd | |
| 5,368,370 A | 11/1994 | Beam | |
| 5,435,631 A | 7/1995 | Maloney et al. | |
| 5,458,401 A | 10/1995 | Baccman | |
| 5,461,779 A | 10/1995 | Beam | |
| 5,577,809 A | 11/1996 | Chase | |
| 5,597,213 A | 1/1997 | Chase | |
| 5,636,906 A | 6/1997 | Chase | |
| 5,664,845 A | * 9/1997 | Maloney et al. ......... | 301/37.43 |
| 6,302,494 B1 | 10/2001 | DiMarco et al. | |
| 6,637,832 B2 | * 10/2003 | Wrase et al. ............. | 301/37.31 |
| 2002/0093242 A1 | * 7/2002 | Chase et al. ............. | 301/37.43 |

FOREIGN PATENT DOCUMENTS

| | | |
|---|---|---|
| DE | 28 13 412 | 10/1979 |
| DE | 694 23 116 T2 | 11/2000 |
| EP | 0 785 875 B1 | 2/2000 |

* cited by examiner

Primary Examiner—Russell D. Stormer
(74) Attorney, Agent, or Firm—Butzel Long

(57) ABSTRACT

A composite wheel assembly includes a wheel having an outboard surface and a wheel ornamentation disposed over the outboard surface. The wheel ornamentation has a plurality of vent openings and a plurality of lug stud holes. The composite wheel assembly also includes an adhesive disposed between the wheel ornamentation and the wheel around each of the vent openings. The composite wheel assembly further includes at least one seal comprising an o-ring disposed between the wheel ornamentation and the wheel about at least one of the lug stud holes to prevent contaminants from entering the assembly between the wheel ornamentation and the wheel.

17 Claims, 3 Drawing Sheets

COMPOSITE WHEEL ASSEMBLY

BACKGROUND OF THE INVENTION

1. Field of the Invention

The present invention relates generally to wheels for vehicles and, more specifically, to a composite wheel assembly for wheels of a vehicle.

2. Description of the Related Art

It is known to provide wheel ornamentation such as wheel caps and wheel covers for wheels of a vehicle such as an automotive vehicle to enhance appearance of the wheels.

Wheel ornamentation is used because it is less expensive to manufacture, finish, and mount the wheel ornamentation to the wheel than to manufacture the wheel with the same quality finish of the wheel ornamentation. A chrome surface on the wheel ornamentation is an inexpensive alternative to a chrome plated or polished wheel. In addition, wheel ornamentation provides various types of appearances and styling variations, all of which may be combined with a single wheel design.

It is also known to manufacture a composite wheel assembly having a wheel ornamentation attached to the wheel with either an adhesive and/or mechanical lock. An example of such a composite wheel assembly is disclosed in U.S. Pat. No. 5,368,370 to Beam. In this patent, the composite wheel assembly includes an annular rim having two rim flanges and a spider fixed within the rim and attached to a rotating hub. The spider includes a plurality of radial spokes. Lug stud holes are formed in the spider and are circumferentially spaced about a central axis of the assembly. A stamped sheet metal appliqué conforming to the outer surface curvature of the rim and spider is attached. The appliqué is chrome-plated to simulate a conventional prior art electroplate chrome wheel assembly. The appliqué includes vent openings positioned between the spokes of the spider, and apertures aligned over each of the lug stud holes of the spider for passage of lug studs. A separately detachable center cap attaches to the spider and/or hub.

It is desirable to provide a composite wheel assembly having a plastic wheel ornamentation retained to a wheel of a vehicle. It is also desirable to provide a composite wheel assembly having a plastic wheel ornamentation attached to the wheel with an adhesive. It is further desirable to provide a composite wheel assembly having a plastic wheel ornamentation that incorporates an o-ring, gasket, or other non-curing material seal to seal the plastic wheel ornamentation to the wheel and prevent contaminants from entering the assembly between the plastic wheel ornamentation and wheel. Therefore, there is a need in the art to provide a composite wheel assembly that meets these desires.

SUMMARY OF THE INVENTION

Accordingly, the present invention is a composite wheel assembly. The composite wheel assembly includes a wheel having an outboard surface and a wheel ornamentation disposed over the outboard surface. The wheel ornamentation has a plurality of vent openings and a plurality of lug stud holes. The composite wheel assembly also includes an adhesive disposed between the wheel ornamentation and the wheel around each of the vent openings. The composite wheel assembly further includes at least one seal comprising an o-ring disposed between the wheel ornamentation and the wheel about at least one of the lug stud holes to prevent contaminants from entering the assembly between the wheel ornamentation and the wheel.

One advantage of the present invention is that a new composite wheel assembly is provided for a wheel of a vehicle. Another advantage of the present invention is that the composite wheel assembly has a plastic wheel ornamentation attached to the wheel with an adhesive. Yet another advantage of the present invention is that the composite wheel assembly has a plastic wheel ornamentation and incorporates an o-ring to seal the plastic wheel ornamentation to the wheel and prevent contaminants from entering the assembly between the plastic wheel ornamentation and wheel.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
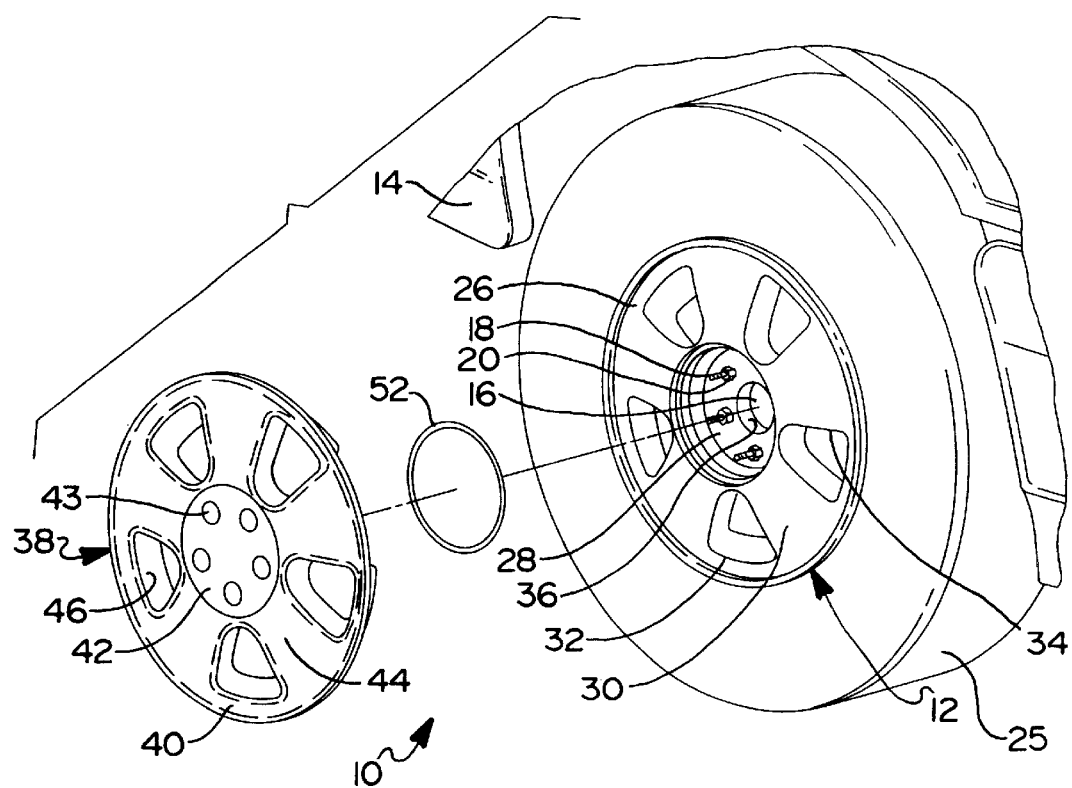
FIG. 1 is an exploded view of a composite wheel assembly, according to the present invention, illustrated in operational relationship with a wheel of a vehicle.

Referring to the drawings and in particular FIG. 1, one embodiment of a composite wheel assembly 10, according to the present invention, is shown for a wheel, generally indicated at 12, of a vehicle 14 such as an automotive vehicle. The vehicle 14 has at least one wheel hub 16 with a plurality of lug studs 18 extending axially therefrom. The wheel 12 is secured to the wheel hub 16 with a plurality of lug nuts 20 which threadingly engage the lug studs 18. It should be appreciated that, except for the composite wheel assembly 10, the vehicle 14 is conventional and known in the art.

Figure 2:
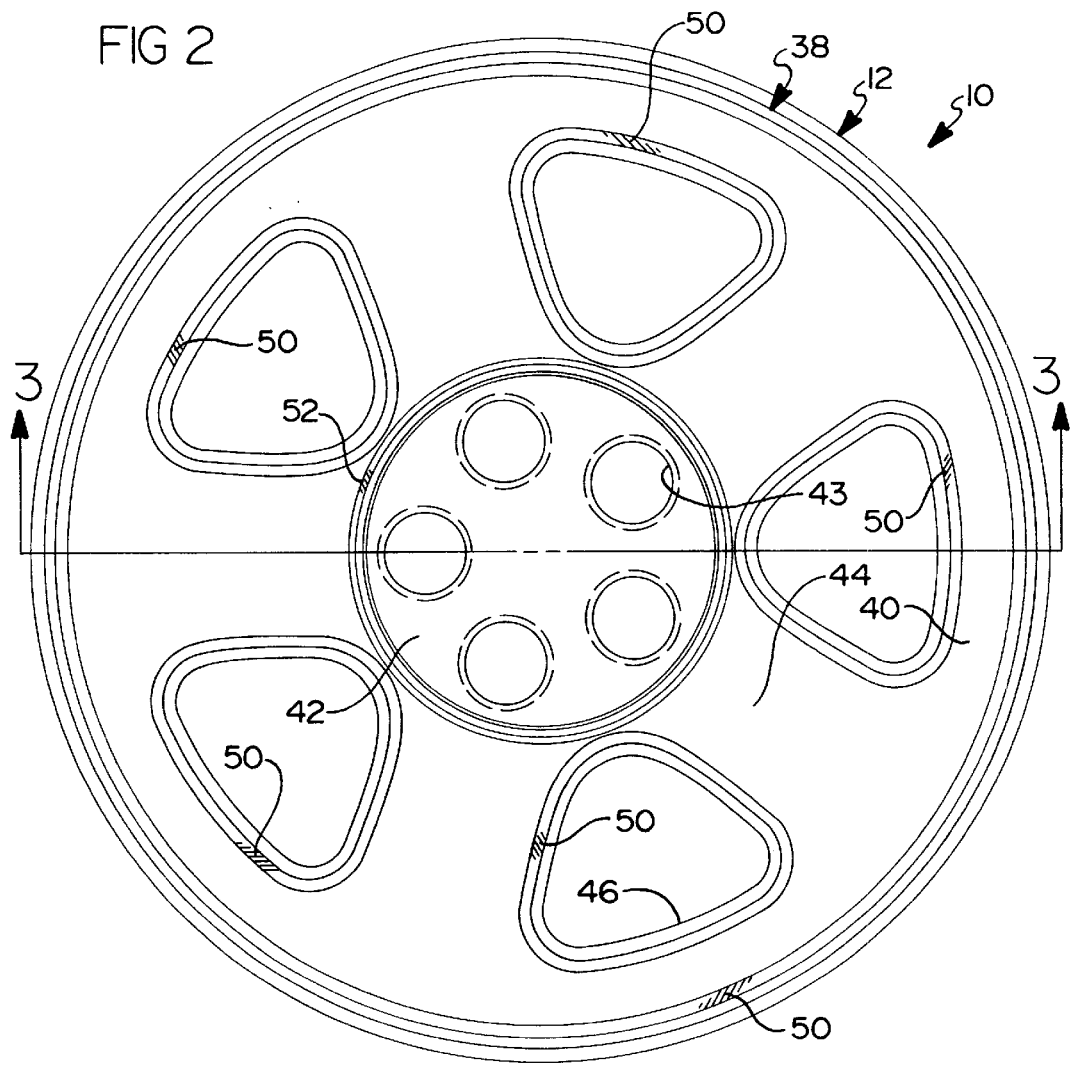
FIG. 2 is an elevational view of the composite wheel assembly and wheel of FIG. 1.
Figure 3:
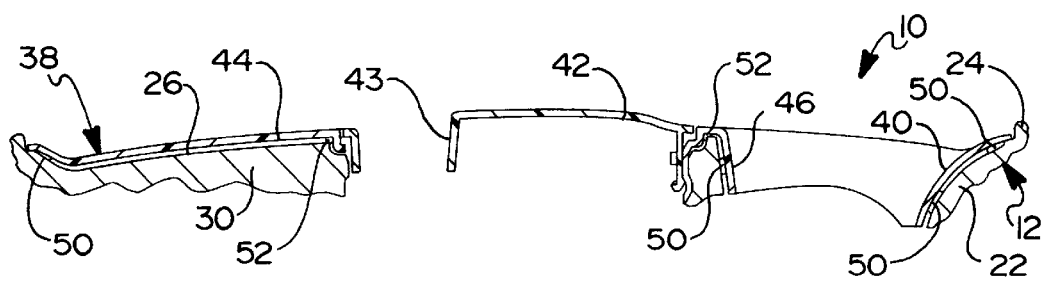
FIG. 3 is a sectional view taken along line 3—3 of FIG. 2.

Referring to FIGS. 1 through 3, the wheel 12 includes an annular rim 22 and a pair of rim flanges 24 spaced on opposite sides of a well portion (not shown), over which a standard tube-type or tubeless tire 25 is mounted. The wheel 12 also includes a spider 26 concentrically fixed within the rim 16 for connection to the lug studs 18. The spider 26 includes a center portion 28 and a plurality of spokes 30 extending radially from the center portion 28 to a spoke flange 32. The spider 26 also includes venting spaces 34 interposed between adjacent spokes 30. The center portion 28 includes a center hole 36 for receiving a protruding portion (not shown) of the hub 16. The spider 26 includes a plurality of lug stud holes (not shown) disposed circumferentially about the center hole 36 to allow the lug studs 18 extending from the hub 16 to pass through the holes. The wheel 12 is made of a metal material such as aluminum or steel. Preferably, the wheel 12 is manufactured from fabricated or cast aluminum. It should be appreciated that any type of face design or material can be used for the wheel 12.

The composite wheel assembly 10 includes a wheel ornamentation, generally indicated at 38, for attachment to the wheel 12. In the embodiment shown, the wheel ornamentation 38 overlaps the rim 22 and spider 26 to present an ornamental surface treatment to the visible outer portions of the composite wheel assembly 10. The wheel ornamentation 38 has an annular outer connecting portion 40 disposed adjacent the rim 22 and spoke flange 34 of the spider 26. The wheel ornamentation 40 also includes an annular inner connecting portion 42 generally overlying at least a portion of the center portion 28. The inner connecting portion 42 includes a plurality of lug stud holes 43 disposed circumferentially thereabout to allow the lug studs 18 extending from the hub 16 to pass through the holes 43. The wheel ornamentation 38 includes a plurality of spokes 44 extending radially between the outer connecting portion 40 and the inner connecting portion 42. The wheel ornamentation 38 also includes vent openings 46 interposed between adjacent spokes 44 and aligned between the spokes 34 of the spider 26. The vent openings 46 are radially positioned between the outer connecting portion 40 and the inner connecting portion 42. Preferably, the vent openings 46 correspond with the vent spaces 34 of the wheel 12. The vent openings 46 may vary from the configuration of the spokes 30 so that different and unique ornamental designs can be achieved. In some cases, the number of vent openings 46 need not be equal to the number of vent spaces 34.

The wheel ornamentation 38 is made of a plastic or metal material. Conventional injection molding or stamping forms the wheel ornamentation 38. The wheel ornamentation 38 is a monolithic structure being integral, unitary, and one-piece.

The composite wheel assembly 10 includes an adhesive 50 for permanently bonding the wheel ornamentation 38 to the wheel 12 at selected surface areas. Preferably, the adhesive is an epoxy material or glue type substance, preferably RTV Sealant disposed between the wheel ornamentation 38 and the wheel 12. The adhesive 50 is disposed completely about each of the vent openings 50 of the wheel ornamentation 38. The adhesive 50 is also completely disposed about the outer connecting portion 40 of the wheel ornamentation 38. It should be appreciated that, regardless of the specific adhesive employed, the adhesive 50 must be heat resistant so that its holding power is not compromised under high heat conditions.

The composite wheel assembly 10 also includes a seal 52 to seal the wheel ornamentation 38 to the wheel 12 and prevent contaminants from entering the assembly 10 between the wheel ornamentation 38 and the wheel 12. The seal 52 is generally circular in shape with a generally circular cross-section. As illustrated, the seal 52 is of a diameter to be disposed about the inner connecting portion 42 of the wheel ornamentation 38 to prevent contaminants from the hub 16 of the wheel 12 from entering between the wheel ornamentation 38 and the wheel 12. It should be appreciated that the adhesive 50 on the outer connecting portion 40 is optional and may be replaced with another seal 52 of suitable diameter.

The seal 52 is made of an elastomeric material such as rubber. In the embodiment illustrated in FIGS. 1 through 3, the seal 52 is a single member being continuous and forming a closed loop. It should be appreciated that, without the seal 52, contaminants may enter the assembly 10 between the wheel ornamentation 38 and the wheel 12.

Figure 4:
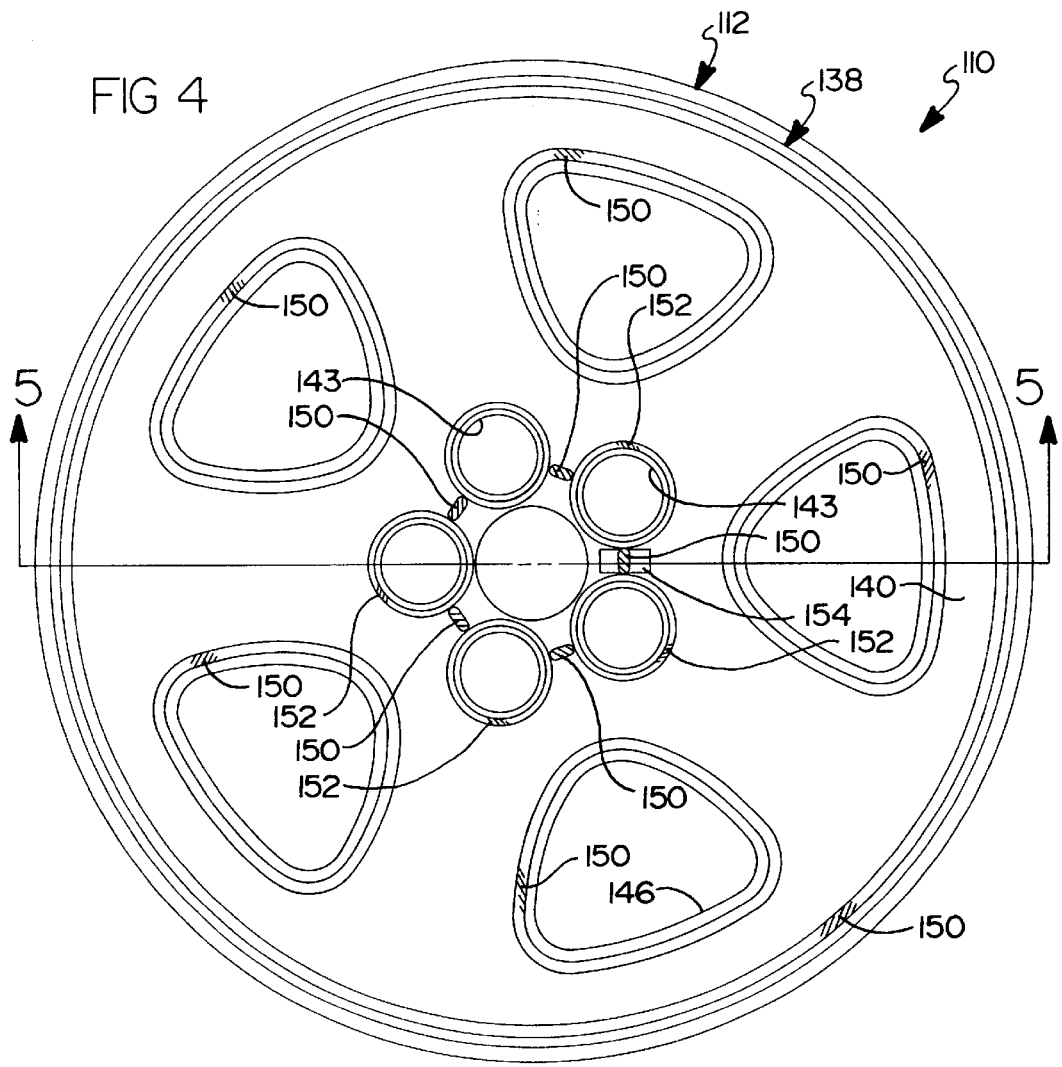
FIG. 4 is an elevational view of another embodiment, according to the present invention, of the composite wheel assembly of FIG. 1.
Figure 5:
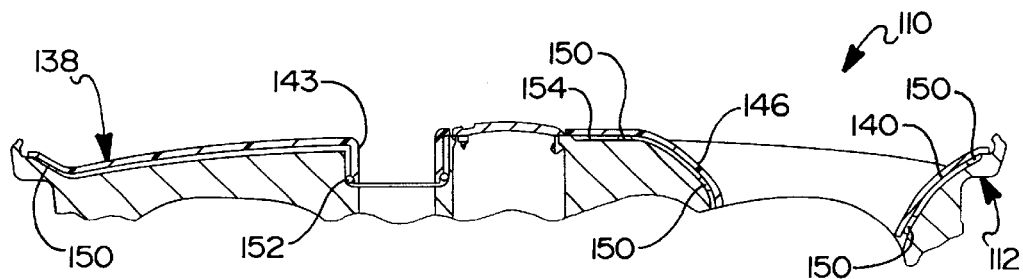
FIG. 5 is a sectional view taken along line 5—5 of FIG. 4.

Referring to FIGS. 4 and 5, another embodiment, according to the present invention, of the composite wheel assembly 10 is shown. Like parts of the composite wheel assembly 10 have like reference numerals increased by one hundred (100). In this embodiment, the composite wheel assembly 110 includes the wheel 112 and wheel ornamentation 138.

The composite wheel assembly 110 also includes the adhesive 150 for permanently bonding the wheel ornamentation 138 to the wheel 112 at selected surface areas. Preferably, the adhesive is an epoxy material or glue type substance, preferably RTV Sealant disposed between the wheel ornamentation 138 and the wheel 112. The adhesive 150 is disposed completely about each of the vent openings 150 of the wheel ornamentation 138. The adhesive 150 is also completely disposed about the outer connecting portion 140 of the wheel ornamentation 138. It should be appreciated that, regardless of the specific adhesive employed, the adhesive 150 must be heat resistant so that its holding power is not compromised under high heat conditions.

The composite wheel assembly 110 also includes a seal 152 around each lug stud hole 143 to seal the wheel ornamentation 138 to the wheel 112 and prevent contaminants from entering the assembly 110 between the wheel ornamentation 138 and the wheel 112. The seal 152 is generally circular in shape with a generally circular cross-section. As illustrated, the seal 152 is of a diameter to be disposed about the lug stud hole 143 of the wheel ornamentation 138. The composite wheel assembly 110 includes the adhesive 150 being disposed between the seals 152. Together, the seals 152 and adhesive 150 therebetween prevent contaminants from the hub 16 of the wheel 112 from entering between the wheel ornamentation 138 and the wheel 112. The composite wheel assembly 110 may also include a self-adhesive pad 154 such as an acrylic tape disposed between the seals 152 to prevent contaminants from entering between the wheel ornamentation 138 and the wheel 112. It should be appreciated that the self-adhesive pad 154 is optional and may be used with the adhesive 150 or in place of the adhesive 150 to act as a seal. It should also be appreciated that the adhesive 150 on the outer connecting portion 140 is optional and may be replaced with another seal 152 of suitable diameter.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A composite wheel assembly comprising:

a wheel having an outboard surface;

an wheel ornamentation disposed over said outboard surface, said wheel ornamentation having a plurality of vent openings and a plurality of lug stud holes;

an adhesive disposed between said wheel ornamentation and said wheel around each of said vent openings; and at least one seal comprising an o-ring disposed between said wheel ornamentation and said wheel about at least one of said lug stud holes to prevent contaminants from entering said assembly between said wheel ornamentation and said wheel.

2. A composite wheel assembly as set forth in claim 1 wherein said adhesive is disposed between said wheel ornamentation and said wheel around about an outer periphery.

3. A composite wheel assembly as set forth in claim 1 wherein said at least one seal is a single member forming a closed loop.

4. A composite wheel assembly as set forth in claim 1 wherein said at least one seal comprises a plurality of individual seal members, one of said seal members surrounding each of the lug nut holes independently.

5. A composite wheel assembly as set forth in claim 4 including a self-adhesive pad disposed between a pair of said seal members.

6. A composite wheel assembly as set forth in claim 4 wherein said adhesive is disposed between said wheel ornamentation and said wheel and between a pair of said seal members.

7. A composite wheel assembly as set forth in claim 1 wherein said at least one seal is made of an elastomeric material.

8. A composite wheel assembly as set forth in claim 1 wherein said wheel ornamentation is made either one of a plastic material and metal material.

9. A composite wheel assembly as set forth in claim 1 wherein said wheel is made of a metal material.

10. A composite wheel assembly for attachment to a wheel hub with a plurality of lug nuts, said composite wheel assembly comprising:
    a metal wheel having an outboard surface;
    a wheel ornamentation disposed over said outboard surface, said wheel ornamentation having a plurality of vent openings and a plurality of lug stud holes, said wheel ornamentation being made of either one of a plastic material and metal material;
    an adhesive disposed between said wheel ornamentation and said wheel around each of said vent openings; and
    at least one seal comprising an o-ring disposed between said wheel ornamentation and said wheel about at least one of said lug stud holes to prevent contaminants from entering said assembly between said wheel ornamentation and said wheel.

11. A composite wheel assembly as set forth in claim 10 wherein said adhesive is disposed between said wheel ornamentation and said wheel around about an outer periphery.

12. A composite wheel assembly as set forth in claim 10 wherein said at least one seal is a single member forming a closed loop.

13. A composite wheel assembly as set forth in claim 10 wherein said at least one seal comprises a plurality of individual seal members, one of said seal members surrounding each of the lug nut holes independently.

14. A composite wheel assembly as set forth in claim 13 including a self-adhesive pad disposed between a pair of said seal members.

15. A composite wheel assembly as set forth in claim 13 wherein said adhesive is disposed between said wheel ornamentation and said wheel and between a pair of said seal members.

16. A composite wheel assembly as set forth in claim 10 wherein said at least one seal is made of an elastomeric material.

17. A wheel assembly for a vehicle comprising:
    a wheel adapted to be secured to a wheel hub with a plurality of lug nuts;
    a wheel ornamentation for covering a portion of said wheel and made of either one of a plastic material and metal material and having an outboard surface and an inboard surface;
    an adhesive disposed between said wheel ornamentation and said wheel around each of said vent openings; and
    at least one seal comprising an o-ring made of an elastomeric material disposed between said wheel ornamentation and said wheel about at least one of said lug stud holes to prevent contaminants from entering said assembly between said wheel ornamentation and said wheel.

* * * * *